Nov. 13, 1956     C. L. DAY ET AL     2,770,348
CONTAINER ACTUATED DIVIDER
Filed March 18, 1953     4 Sheets-Sheet 1

INVENTORS
*Carl L. Day*
*Frederick E. Fauth*

BY *Cushman, Darby & Cushman*
ATTORNEYS

Nov. 13, 1956 C. L. DAY ET AL 2,770,348
CONTAINER ACTUATED DIVIDER
Filed March 18, 1953 4 Sheets-Sheet 2
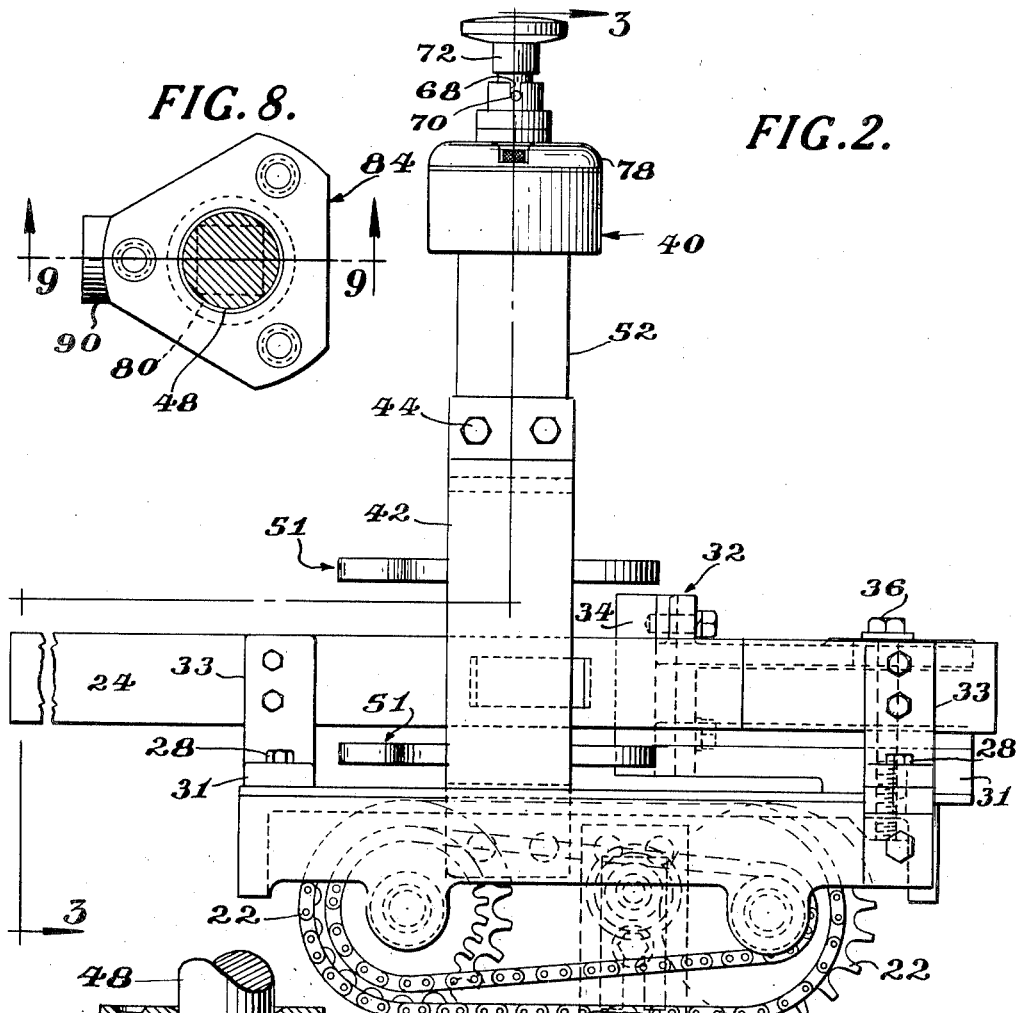
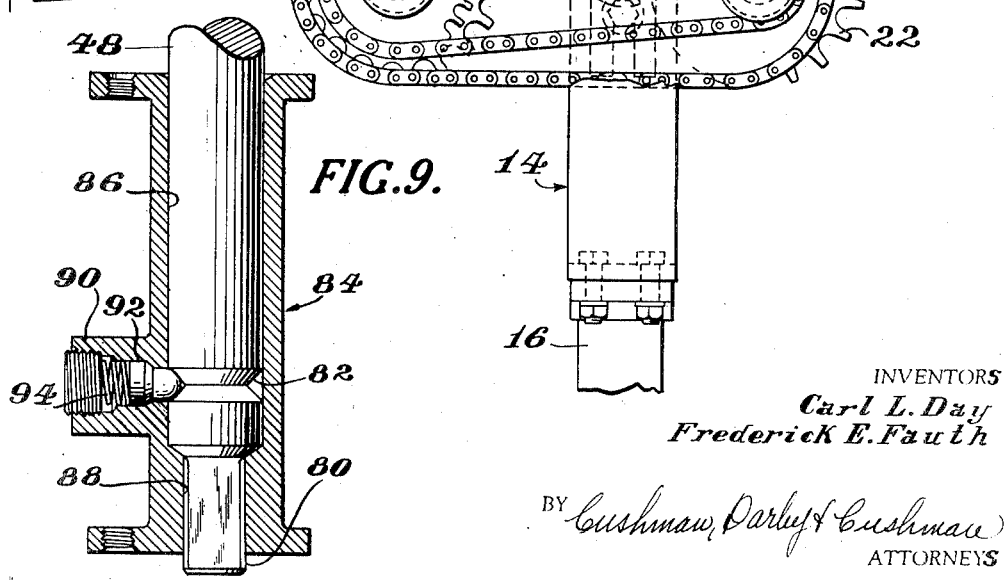
INVENTORS
Carl L. Day
Frederick E. Fauth
BY Cushman, Darby & Cushman
ATTORNEYS

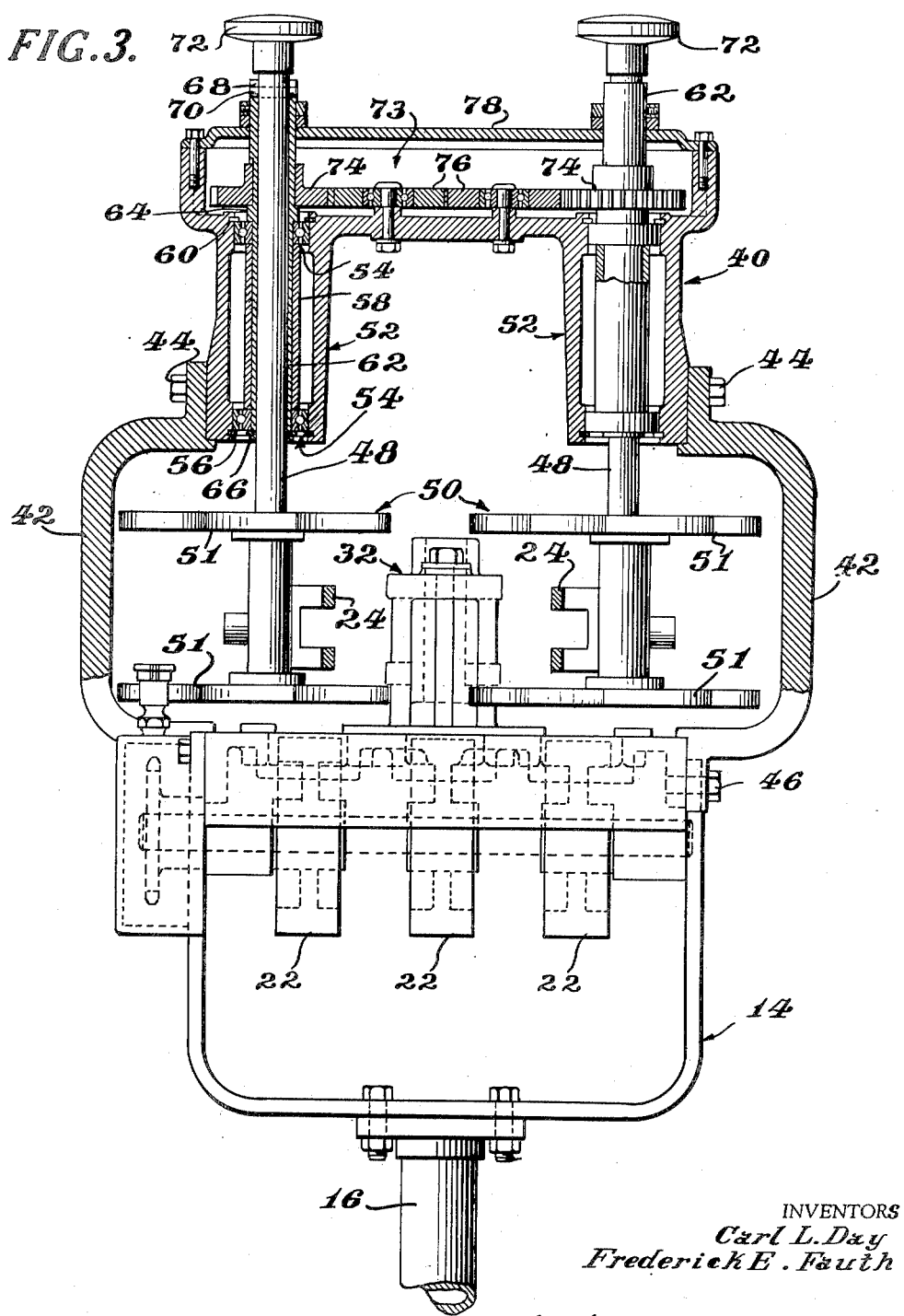

Nov. 13, 1956    C. L. DAY ET AL    2,770,348
CONTAINER ACTUATED DIVIDER
Filed March 18, 1953    4 Sheets-Sheet 4
FIG. 4.
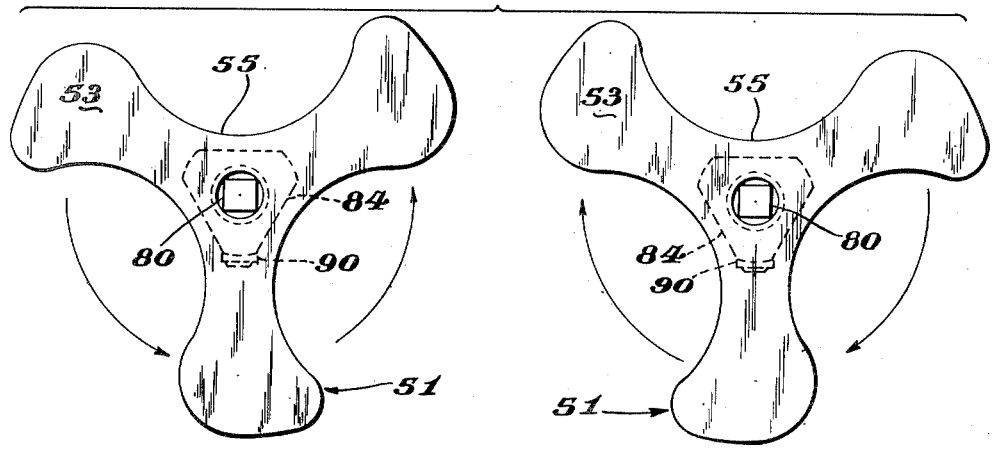
FIG. 5.  FIG. 6.
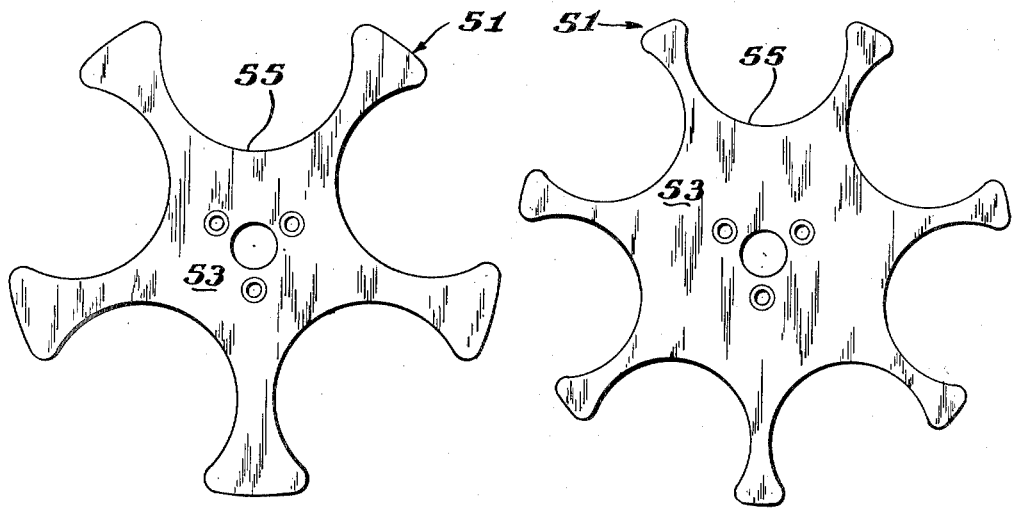
FIG. 7.
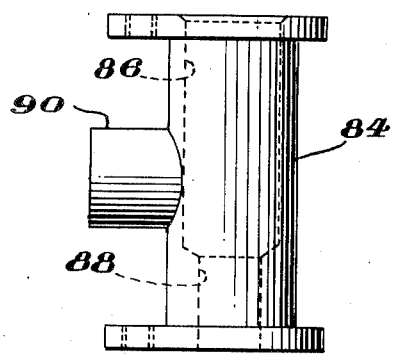
INVENTORS
Carl L. Day
Frederick E. Fauth
BY Cushman, Darby & Cushman
ATTORNEYS

United States Patent Office 2,770,348
Patented Nov. 13, 1956

2,770,348

CONTAINER ACTUATED DIVIDER

Carl L. Day and Frederick E. Fauth, Baltimore, Md., assignors to Crown Cork & Seal Company, Inc., Baltimore, Md., a corporation of New York Application March 18, 1953, Serial No. 343,128

9 Claims. (Cl. 198—31)

The present invention relates to a container actuated divider mechanism, and more particularly, to a container actuated divider mechanism for separating a single line of articles travelling on an infeed conveyor structure into a plurality of lines of articles on an outfeed conveyor structure.

In present day bottling and canning plants, containers, such as bottles, cans or the like, are largely handled by means of chain and link conveyors to transfer them from one place to another. It is oftentimes necessary to distribute the articles being conveyed on the chain and link type conveyors from a single source of supply into a plurality of lines of articles to feed a plurality of machines. An instance in a bottling plant where it would be necessary to distribute the articles from a single row into a plurality of rows is when articles are coming from a soaker and are being supplied to a plurality of filling machines. Usually the soaker will handle enough articles to supply several filling machines and thus it is evident that a mechanism must be provided to efficiently distribute the articles from a single line into a plurality of lines without the necessity of an operator being continuously present. The above example is merely one instance in a bottling plant where the use of a divider mechanism is necessary but, of course, there are many other instances in bottling or any other type of plants where containers are being conveyed that such a device has utility.

An object of this invention is to provide a mechanism for dividing or distributing a single row of articles, for example, soft drink, beer or milk bottles and cans into a plurality of rows regardless of whether or not the article is cylindrical or square.

Another object of the present invention is to provide a conveyor divider mechanism which is actuated by the articles being supplied thereto. In other words the present invention eliminates the use of positively driven mechanisms and thus the speed of the mechanism will be determined by the supply. Further, the cost of manufacturing and maintenance of a device of this character is materially reduced because positive means for operating it, such as a motor or the like, is eliminated.

Another object of the present invention is to provide a conveyor divider mechanism which will divide the articles from a single line into two lines in an orderly manner without jamming or scuffing the articles.

A still further and very important object of the present invention is to provide a conveyor divider mechanism which may be used in handling articles of various sizes and shapes. By providing the mechanism with means for universally adjusting it for accommodating various sizes of articles, time of a switchover from one size article to another is materially reduced. Further, the need for changing a divider mechanism as a unit to accommodate a different size article is entirely eliminated and, thus, plants can have a higher output with a material reduction in cost.

A still further object of the present invention is to provide article-directing disk assemblies or star wheels which may be quickly and easily interchanged with other disk assemblies of varying sizes when it is desired to change from one size article to another. By having the article-directing disk assembly easily interchangeable without the necessity of completely disassembling the mechanism, the utility is greatly enhanced.

These and other objects of the invention will appear more clearly from the following specification, claims and drawings in which:

Figure 2 is a side elevational view of the conveyor divider mechanism of Figure 1.

Figure 3 is an end view of the conveyor divider mechanism, partly in cross-section, and taken along the line 3—3 of Figure 2.

Figure 1:
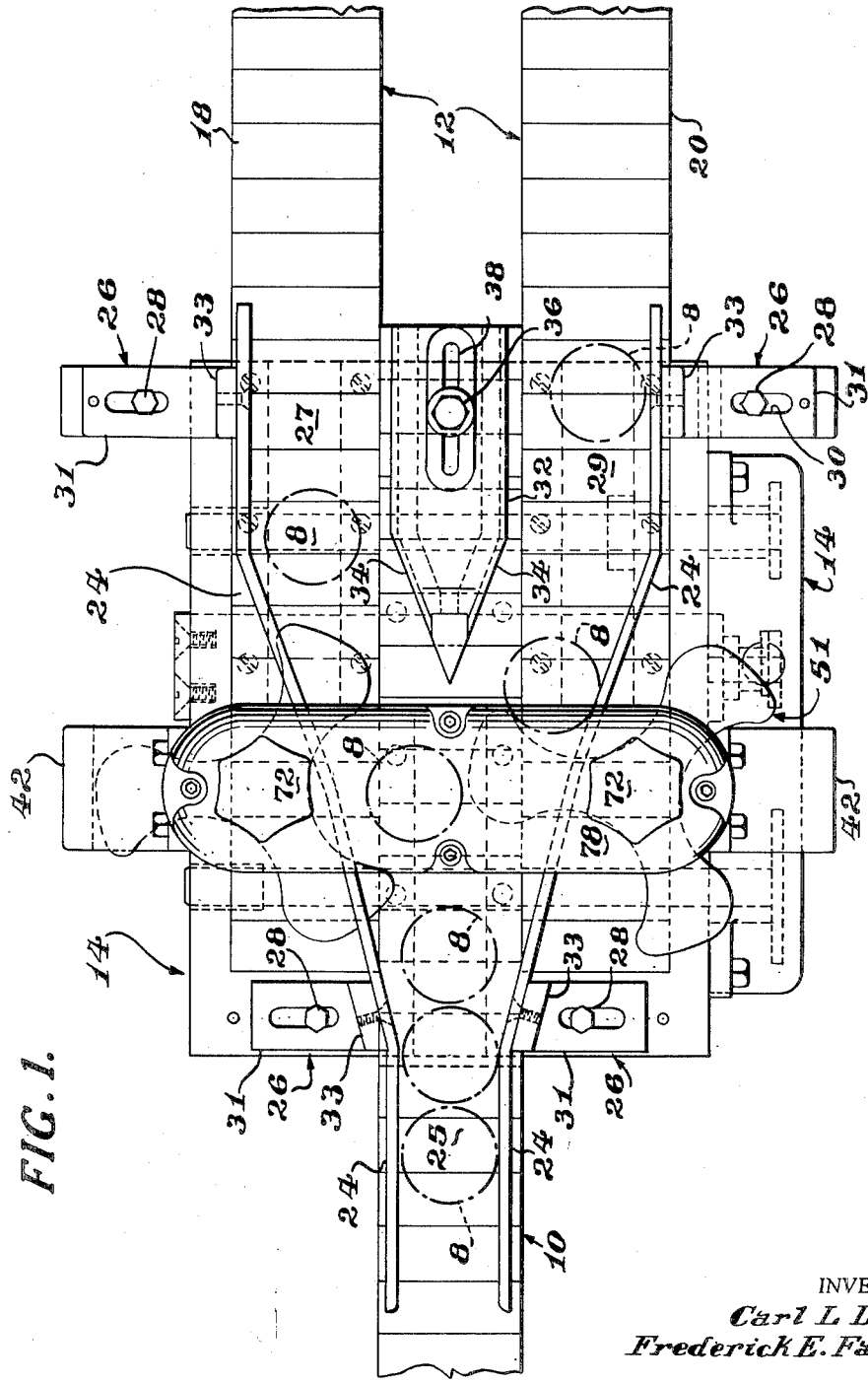
Figure 1 is a plan view of the conveyor mechanism showing articles being conveyed from a single row and distributed into two rows.

Figures 4 to 6 inclusive are plan views of various sizes of article-directing disks.

Figure 7 is a side elevational of one the spider hubs on which the article-directing disks are mounted.

Figure 8 is plan view of the spider hub shown in Figure 7, and

Figure 9 is a close sectional view of the spider hub taken on the line 9—9 of Figure 8.

Referring specifically to the drawings wherein like characters or refeernce numerals represent like or similar parts, the container divider mechanism disclosed is for dividing a row of articles 8 travelling on an infeed conveyor structure 10 into two rows of articles on an outfeed or discharge conveyor structure 12. Although the particular embodiment of the invention disclosed herein will refer to dividing action of the mechanism, it will be obvious to those skilled in the art that the mechanism could also be used for combining a plurality of rows of articles into a single row of articles by reversing the direction of conveyors 10 and 12. Of course, necessary adjustments to the mechanism would have to be made in order to obtain this further utility of the device, such as reversing the disk assembly 50. As shown in Figures 1 and 2, the article actuated divider mechanism is provided with a supporting frame 14, which may be interposed into conveyor lines leading to and from various units of operation in a bottling or canning plant. Frame 14 is provided with suitable means for receiving the infeed conveyor 10 and the outfeed conveyors 12. Frame 14 is also provided with supporting legs 16 which may be adjusted for various heights by any suitable means so that the divider mechanism may be adapted for use with existing conveyor lines within a plant.

Conveyor structures 10 and 12, as disclosed in Figure 1, are flat topped chain and link endless type of conveyors, now commonly used throughout the bottling industry. In the preferred embodiment disclosed, infeed conveyor structure 10 is shown as a single flat top conveyor whereas outfeed conveyor structure 12 is shown as separate outfeed conveyors 18 and 20. Of course, outfeed conveyor structure 12 could be a single conveyor having separate passageways for guiding the separated articles to different destinations. Suitable idler sprockets 22 are provided within frame 14 for receiving the aforementioned infeed and outfeed conveyors.

It might be mentioned at this point that the outfeed conveyors may be run at a slower speed than the infeed conveyor because each outfeed conveyor will be handling only one-half the number of bottles fed into the divider mechanism. On the other hand, the speed of operation of the outfeed conveyors may be the same or faster than the speed of operation of the infeed conveyors depending on existing operating conditions.

Mounted on the frame 14 and extending from adjacent the infeed conveyors to adjacent the outfeed conveyors, are a pair of diametrically opposed guide rails 24. Guide rails 24, which define an infeed passageway 25 for the incoming articles diverge outwardly from the infeed passageway to two discharge passageways 27 and 29. Guide rails 24 are rigidly secured to the frame 14 by means of angle shaped brackets 26. Brackets 26 are provided with a base leg 31 and arm 33 which are rigidly bolted to the frame 14 and guide rails 24 respectively. Generally the brackets are secured to guide rails 24 adjacent each end thereof, as shown in Figures 1 and 2. In order that guide rails 24 may be adjusted transversely of frame 14, a transverse slot 30 is provided in the base legs 31 of brackets 26 and the bolts or studs 28 which attach the brackets to frame 14 pass therethrough. To adjust the width of the infeed and discharge passageways 25, 27 and 29, it is only necessary to loosen bolts 28 and move guide rails 24 transversely of the frame. The length of slot 30 limits the inner or outer movement of guide rails 24.

Also mounted on frame 14 adjacent and centrally of the discharge or outfeed conveyors 18 and 20 is a wedge-shaped divided member 32 having its apex pointed toward infeed passageway 25. Wedge-shaped divider member 32 is provided with lateral converging surfaces 34 which are spaced from and parallel to each of the diverging portions of guide rails 24. The purpose of divider member 32 will be explained in more detail later in the specification.

A bolt 36 which extends through a longitudinal slot 38 in the base of divider member 34 rigidly secures it to frame 14 in any adjusted position. The longitudinal adjustment of divider member 32 is similar to that explained above in reference to guide rails 24, in that it is merely necessary to release bolt 36 and longitudinally move the divider member toward or away from the infeed passageway. In making an adjustment for a different size article, it is now evident that it is necessary to both adjust the guide rails 24 and the guide member 32 so that proper clearances can be maintained.

Referring now to Figures 2 and 3, frame 14 is provided with a housing 40 which transversely bridges the frame and conveyor structures. In more detail, a pair of arms 42 are bolted to either side of frame 14 by means of bolts 46 and extend upwardly therefrom. Housing 40 is then secured to the upper ends of arms 42 by suitable means, such as bolts 44. Thus, it is easily seen that the housing structure will bridge the surface of frame 14 and conveyors 10 and 12, leaving enough clearance for an article to pass therethrough.

Mounted within the housing 40 are a pair of shafts 48 which are positioned diametrically opposite one another. Connected to the ends of the shafts 48 are bottle actuated directing disk assemblies 50 which will control the path and direction of the article when it is passing through the mechanism.

Housing 40 is provided with spaced bosses 52 for journaling shafts 48. Each of the bosses 52 is provided with an upper and lower bearing 54. Lower bearing 54 is held in position in boss 52 by means of a lock ring 56 whereas upper bearing 54, which is spaced from the lower bearing by means of a spacer 58, is held in position by a lock ring 60. An elongated bearing sleeve 62 is positioned in each boss 52 within its upper and lower bearings 54 and is maintained in position by a collar 64 which rests on the inner races of the upper bearing 54. Sleeve 62 is also maintained in position by an additional lock ring 66 which supports the inner race of the lower bearing and the sleeve as an integral unit. The sleeves 62 are able to rotate within bearings 54 and thus provide a means of supporting and rotating the shafts 48.

At the upper end of each of the sleeves 62, a slot 68 is provided. Slots 68 will cooperate with a radial pin 70 extending from and rigidly mounted in the upper end of each of the shafts 48. It is now obvious that pin 70 of shaft 48 when locked in engagement with the slot 68 will cause the shaft 48 to be supported by and to turn as an integral unit with the bearing sleeve 62. A knob or handle 72 is provided on the upper ends of shaft 48 so that the shaft 48 may be lifted axially to remove the aforementioned article-directing disk assemblies 50. This important feature of removing the article-directing disk assemblies will be explained in detail later in the specification.

Keyed to each bearing sleeve 62 at its upper end is a gear 74. Gears 74 mesh with two idler gears 76 so that when one article-directing disk assembly is rotated, the other article-directing disk assembly will also be rotated in an opposite direction. Thus, the proper relationship between the rotating disk assemblies 50 will always be maintained. The gear train comprising the gears 74 and 76 is covered within the housing by means of cover plate 78 and thus dirt and foreign material is eliminated from the gears and bearings.

Referring now to Figures 4 through 9 inclusive, each of shafts 48 is provided at its lower end with an article-directing disk assembly 50. An important feature of the invention is the fact that this article-directing disk assembly 50 may be simply and easily replaced by merely raising shaft 48 by means of handle 72 and removing disk assembly 50 laterally or horizontally therefrom. To provide a disk assembly which may be easily removed, the shaft 48 must be provided with a shank portion 80 at its lower portion which is square in section. Also, the shaft 48 is provided with a circumferential groove 82 positioned immediately above the square shank portion 80. Article-directing disk assemblies 50 are provided with a spider hub 84 on which upper and lower disks or star wheels are bolted. Hub 84 has a bore 86 of a diameter substantially the same as the diameter of shaft 48 extending therethrough to a reduced portion at the lower end thereof. The lower portion of the bore 86 is made square in section as shown at 88 so that it will cooperate with the shank portion 80 and accurately position disk member 50 on shaft 48.

To retain the spider hub on shaft 48, a radial boss 90, having a bore 91 extending radially therethrough into the bore 86, is provided on the hub. A pin 92 which is spring pressed into the bore 86 by means of the spring 94 is positioned in bore 91 of boss 90. Pin 92 will engage the groove 82 on the shaft 48 and maintain the disk assembly 50 vertically on shaft 48.

As previously stated, each of the disk members 50 is provided with an upper and lower disk or star wheel 51 having a plurality of teeth 53 thereon providing recesses 55 therebetween for receiving the article being conveyed and directed. As shown in Figures 4 to 6, the disks may be provided with a different number of teeth to accommodate different size articles. For example, the disks shown in Figure 4 would be used for quart bottles whereas the disks shown in Figures 5 and 6 would be used for pints and half-pints respectively.

In operation, articles travelling on conveyor 10 in a single line will be fed into the divider mechanism. The articles will engage the article-directing disk assemblies and be forced into a pocket or recess on one disk or the other, depending on the relative positions of the disk at the time the article enters. The disk will be rotated by the force of the article being conveyed through the mechanism and will position the article so that it will be free to go onto only one of the outfeed conveyors 18 or 20. Because the disks are synchronized by means of the gear train 73, the next succeeding article will be conveyed to the other conveyor as the recess of the other disk will now be in position for receiving the article and therefore an equal distribution of articles on the discharge conveyors is obtained.

As previously stated, it is a necessary expedient for bottling and canning plants in modern day mass production to convert their conveyor lines from one size article to another several times during the course of a day. An important advantage of the present invention is that it enables a plant to quickly and efficiently change over a divider mechanism in its conveyor lines so that it will accommodate a different size article. The adjustment of side rails 24 and wedge shape divider member 32 may be quickly made by loosening bolts 28 and 36 and making the required adjustment as to infeed and discharge passageways. However, it is also necessary to remove and replace article-directing disk assemblies 50 in order to have the proper size star wheels. This may be accomplished quickly with a minimum of effort because the shafts on which the disk assemblies are mounted may be lifted axially by merely raising the knob or handle 70. Movement of shafts 48 axially in no way disturbs the gear train 73, or bearings 54 in which elongated sleeve 58 is journalled. After the shafts are vertically raised, disk assemblies 50, which will snap off of shafts 48, may be removed transversely and horizontally from the divider mechanism. A new disk assembly of proper size may then be inserted on the shaft by lowering the shaft into operating position. The article actuated divider mechanism is then ready for operation.

The terminology used in this specification is for the purpose of description and not for limitation, the scope of the invention being defined in the claims.

We claim:

1. A conveyor mechanism for directing articles travelling on a conveyor comprising a supporting frame, a plurality of vertical tubular sleeves rotatably mounted in said frame, a gear train interconnecting said sleeves for synchronizing relative movement of the same, shafts mounted in each of said sleeves, article directing means detachably connected on the lower ends of each of said shafts, and means on the upper ends of said shafts and said sleeves coacting to drivingly connect and support said shafts in said sleeves, said last-mentioned means being detachable to permit upward vertical movement of said shafts with respect to said sleeves whereby the article directing means may be removed from said shafts and replaced.

2. A conveyor divider mechanism for distributing a line of articles travelling on a conveyor into a plurality of lines of articles comprising a supporting frame, a housing mounted on said frame and transversely bridging the same, a plurality of vertical shafts rotatably mounted in oppositely disposed relationship within the said housing, article-directing means detachably connected to the lower ends of said shafts, means synchronizing the relative movement of said article-directing means, bearing means operatively associated with each of said shafts and mounted within said housing for permitting axial upward movement of said shafts whereby said article-directing means may be removed laterally from said shafts and replaced, said bearing means including bearings mounted in said housing, a bearing sleeve mounted within each of said bearings and supported thereby for rotation, and means on the upper end of said shafts and said sleeves coacting to drivingly connect and support said shafts in said sleeves, said last-mentioned means being detachable to permit upward vertical movement of said shafts with respect to said sleeves whereby the article directing means may be removed from said shafts and replaced.

3. A conveyor divider mechanism of the type in claim 2 wherein each of said bearing sleeves has a slot in the upper end thereof and each of said shafts has a radial pin detachably engaging said slot whereby said shafts have a driving connection with said sleeves.

4. A conveyor divider mechanism for distributing a single row of articles travelling on a container into two rows of articles comprising a supporting frame, two oppositely disposed guide rails mounted on said frame and defining an infeed passageway and diverging therefrom toward two discharging passageways, a center dividing member mounted on said frame between the diverging portions of said guide rails, said center dividing member being wedge-shaped and having lateral surfaces lying substantially parallel and spaced from the diverging portions of said guide rails, means connecting said guide rails to said frame for adjustable movement transversely thereof, means connecting said center dividing member to said frame for adjustable movement longitudinally thereof, a housing mounted on said frame and transversely bridging the same between the mouth of said infeed passageway and the apex of said center dividing member, a pair of oppositely disposed shafts rotatably mounted in said housing and having article-directing means detachably connected to their lower end, a gear train connecting said shafts for synchronizing relative movement of said article-directing means, and means operatively associated with each of said shafts for permitting axial movement thereof whereby said article-directing means can be removed laterally and replaced said means for permitting axial movement of said shafts including bearings mounted in said housing for each of said shafts, a bearing sleeve mounted within each of said bearings and supported thereby for rotation, and means connected to the upper ends of each of said shafts detachably engaging the upper end of said bearing sleeves for supporting said shafts for rotation with said bearing sleeves and permitting axial movement of said shafts with respect thereto.

5. A conveyor divider mechanism of the type in claim 4 wherein each of said bearing sleeves having a slot in its upper end, and wherein said last-mentioned means connected to the upper ends of each shaft include a radial pin extending from the upper end of each of said shafts, said pins detachably engaging the slots in said shafts whereby said shafts have a driving connection with said sleeves.

6. In a conveyor mechanism of the character described, a supporting frame, a housing mounted on and transversely bridging said frame, a pair of bearing means oppositely disposed within said housing, each of said bearing means including at least one bearing supported in said housing and an elongated bearing sleeve supported within said bearing for rotation, a gear train interconnecting said bearing sleeves for synchronizing the relative movement of said sleeves, a shaft mounted in each of said sleeves, each of said shafts having a radial pin extending from the upper end thereof, said sleeves having a slot in the upper end thereof in which the pins of said shafts detachably engage, whereby each of said shafts rotates with said sleeves and may be moved axially with respect to its respective sleeve, and article-directing means detachably connected to the lower ends of said shafts, said article-directing means being removed laterally when said shafts are raised vertically.

7. In a conveyor mechanism of the type in claim 6 wherein said shafts have a portion of the lower ends thereof square in section and have a groove positioned above said square portion, and said article-directing means including a star wheel mounted on a spider hub, said spider hub having a bore extending therethrough, one end of said bore being square for receiving the square portion of said shaft, and spring means mounted in said hub and engaging the grooves on said shafts whereby the article-directing means are detachably connected to said shafts.

8. In a conveyor mechanism of the type in claim 7 wherein said spring means includes a spring pressed pin for engaging said groove.

9. In a conveyor mechanism of the character described, a supporting frame, a housing mounted on said frame, two oppositely disposed vertical shafts journalled in said housing, means synchronizing the relative movement of said shafts, article-directing means detachably mounted on the lower ends of each of said shafts, each of said article-directing means including a spider hub having a bore therethrough, and an upper and lower toothed disc mounted on each end of said spider hub and a spring pressed pin mounted within said spider hub and projecting into the bore thereof, said spring pressed pins engaging said shafts whereby the article-directing means are detachably secured in position.

References Cited in the file of this patent

UNITED STATES PATENTS

| | | |
|---|---|---|
| 1,168,899 | Neuteboom | Jan. 18, 1916 |
| 2,390,135 | Tobias | Dec. 4, 1945 |
| 2,404,232 | Hunter | July 16, 1946 |
| 2,454,972 | Martin | Nov. 30, 1948 |
| 2,524,700 | Grant | Oct. 3, 1950 |

FOREIGN PATENTS

| | | |
|---|---|---|
| 617,363 | Great Britain | Feb. 4, 1949 |